US008693733B1

(12) United States Patent
Harrison

(10) Patent No.: US 8,693,733 B1
(45) Date of Patent: Apr. 8, 2014

(54) TARGETED ADVERTISING BASED ON LICENSE PLATE RECOGNITION

(71) Applicant: Arboc, LLC, Bethesda, MD (US)

(72) Inventor: Howard Jason Harrison, Bethesda, MD (US)

(73) Assignee: Arboc, LLC, Bethesda, MD (US)

( * ) Notice: Subject to any disclaimer, the term of this patent is extended or adjusted under 35 U.S.C. 154(b) by 0 days.

(21) Appl. No.: 13/853,344

(22) Filed: Mar. 29, 2013

Related U.S. Application Data

(60) Provisional application No. 61/618,512, filed on Mar. 30, 2012.

(51) Int. Cl.
*G06K 9/00* (2006.01)

(52) U.S. Cl.
USPC .......................................................... 382/105

(58) Field of Classification Search
None
See application file for complete search history.

(56) References Cited

U.S. PATENT DOCUMENTS

2003/0233275 A1* 12/2003 Melvin ............................ 705/14
2008/0249857 A1* 10/2008 Angell et al. .................... 705/14
2010/0179878 A1* 7/2010 Dawson et al. ............. 705/14.62
2011/0228085 A1* 9/2011 Hofman ......................... 348/143
2012/0054028 A1 3/2012 Tengler et al.
2013/0058531 A1* 3/2013 Hedley et al. ................. 382/103

OTHER PUBLICATIONS

TheNewsPaper. "UK Billboards Equipped with License Plate Spy Cameras." UK Billboards Equipped with License Plate Spy Cameras. The Newspaper, Sep. 22, 2009. Web. Nov. 14, 2013.*

* cited by examiner

*Primary Examiner* — Nirav G Patel
(74) *Attorney, Agent, or Firm* — Spano Law Group; Joseph S. Spano

(57) ABSTRACT

Systems and methods to determine a demographic attribute of a likely occupant of a passing vehicle based on a license plate number of the vehicle are presented. A demographic attribute associated with a likely occupant of a passing vehicle is determined based on a license plate number identified with the vehicle. In response, media content targeted to the likely occupant of the passing vehicle is selected based on the demographic attribute. In some embodiments, the selected media content is presented within view of the occupant of the vehicle. In another aspect, a demographic profile of likely occupants of vehicles passing a particular location over a period of time is based on License Plate Recognition (LPR) information gathered at that location. Media content is selected for presentation based on the identified demographic profile.

19 Claims, 6 Drawing Sheets

| LOCATION CODE | VEHICLE IMAGE | TIME | PLATE # | VEHICLE CLASS | ZIP CODE | GENDER M | GENDER F | AGE A | AGE B | AGE C | |
|---|---|---|---|---|---|---|---|---|---|---|---|
| A | XYZ123.BMP | 09/12/2011, 06:14:26 | XYZ123 | COM | 94304 | 80 | 20 | 70 | 25 | 5 | —151 |
| A | ABC125.BMP | 09/12/2011, 06:14:29 | ABC125 | SUV | 94035 | 40 | 60 | 15 | 65 | 25 | —152 |
| A | RUX155.BMP | 09/12/2011, 06:14:35 | RUX155 | MID | 94035 | 25 | 75 | 15 | 75 | 10 | —153 |
| A | RFT597.BMP | 09/12/2011, 06:14:39 | RFT597 | MID | 94304 | 60 | 40 | 65 | 20 | 15 | —154 |
| ⋮ | ⋮ | ⋮ | ⋮ | ⋮ | ⋮ | ⋮ | ⋮ | ⋮ | ⋮ | ⋮ | |
| A | XYZ123(2).BMP | 09/13/2011, 06:09:48 | XYZ123 | COM | 94304 | 80 | 20 | 70 | 25 | 5 | —155 |
| A | RFT597(2).BMP | 09/13/2011, 06:24:16 | RFT597 | MID | 94304 | 60 | 40 | 65 | 20 | 15 | —156 |
| A | RUX155(2).BMP | 09/13/2011, 06:26:57 | RUX155 | MID | 94035 | 25 | 75 | 15 | 75 | 10 | —157 |

MEMORY 150

TARGETED ADVERTISING BASED ON LICENSE PLATE RECOGNITION

CROSS REFERENCE TO RELATED APPLICATIONS

The present application for patent claims priority under 35 U.S.C. §119 from U.S. provisional patent application Ser. No. 61/618,512, entitled "Targeted Advertising Based On License Plate Recognition," filed Mar. 30, 2012, the entire subject matter of which is incorporated herein by reference.

TECHNICAL FIELD

The described embodiments relate to license plate recognition systems and tools.

BACKGROUND INFORMATION

License Plate Recognition (LPR) systems are typically employed to scan and log license plate information associated with vehicles in publically accessible areas. A typical LPR unit performs image analysis on captured images to identify the license plate number associated with each image. The LPR unit generates a record for each license plate number captured. The record may include any of an optical character recognition (OCR) interpretation of the captured license plate image (e.g., output in text string object format), images of the license plate number, an image or images of the vehicle associated with the license plate number, the date and time of image capture, and the location of the image capture. By operating a LPR unit for prolonged periods of time at a given location, the amount of license plate information grows.

Media displays are typically employed to deliver advertising content to viewers in a wide variety of settings. Simple, static media displays (e.g., printed or painted graphics and text) remain widely used. Typically, the content of a particular static media display is fixed for a lengthy period of time (e.g., weeks or months). In addition to static media displays, dynamic media displays have also been widely adopted. The content of dynamic media displays can be frequently refreshed. Traditionally, this ability has been utilized to display a series of advertisements so that a passerby may see more than one advertisement before the viewing opportunity ends.

Both static and dynamic media displays are typically located in highly visible areas based on the rationale that highly visible displays reach more potential customers. Moreover, specific advertising content is often displayed in a particular location based on a limited understanding of the aggregate demographic profile of viewers at that location. However, in many contexts the understanding of the demographic profile of viewers of media displays at any given time and the evolution of the demographic profile over time remains very limited. As a consequence, the effectiveness of displayed advertising content is limited. The uncertainty surrounding the effectiveness of display sign advertising generates resistance to capital investment to replace existing signs with more costly signs that provide the ability to display digital media. Improvements in the identification of a demographic profile of viewers at a particular location, its evolution over time, and the selection of media content targeted to the identified demographic profile is desired.

SUMMARY

Systems and methods to determine a demographic attribute of a likely occupant of a passing vehicle based on a license plate number of the vehicle are presented.

In one aspect, a demographic attribute associated with a likely occupant of a passing vehicle is determined based on a license plate number identified with the vehicle. In response, media content targeted to the likely occupant of the passing vehicle is selected based on the demographic attribute. The selected media content is then presented within view of the occupant of the passing vehicle.

In a further aspect, a demographic profile of likely vehicle occupants passing a particular location over a period of time is based on LPR information gathered at that location. Media content is selected for presentation based on the identified demographic profile. In this manner, media content is presented to viewers that is targeted to reach segments of the identified demographic profile and is able to evolve with changes in the demographic profile.

In another further aspect, a demographic profile associated with likely occupants of vehicles passing a location may be identified based on repeated LPR instances associated with the same vehicle. For example, if one or more vehicles repeatedly pass a particular location at a similar time of day, a demographic profile of the traffic flow at that location for a particular time period may be determined. The demographic profile of the likely occupants of the passing vehicle is mapped to advertising content.

In a further aspect, media content is sequentially selected based on a periodically repeating demographic profile. For example, the demographic profile of likely occupants of vehicles passing a particular location during commute hours on a busy metropolitan freeway repeats each workday. Moreover, many of the same occupants of the passing vehicles pass the same location each workday. In response to this demographic profile, media content is sequentially selected to follow a storyline. In this manner, vehicle occupants are drawn to the advertisement each day to see the next installment of the story.

In another aspect, media content is selected based on a response to an offer to present particular media content that matches a demographic profile of likely occupants of passing vehicles that is currently trending.

The foregoing is a summary and thus contains, by necessity, simplifications, generalizations and omissions of detail. Consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 2 is illustrative of a plurality of LPR instances (151-157) stored in memory 150.

DETAILED DESCRIPTION

Reference will now be made in detail to background examples and some embodiments of the invention, examples of which are illustrated in the accompanying drawings.

Figure 1:
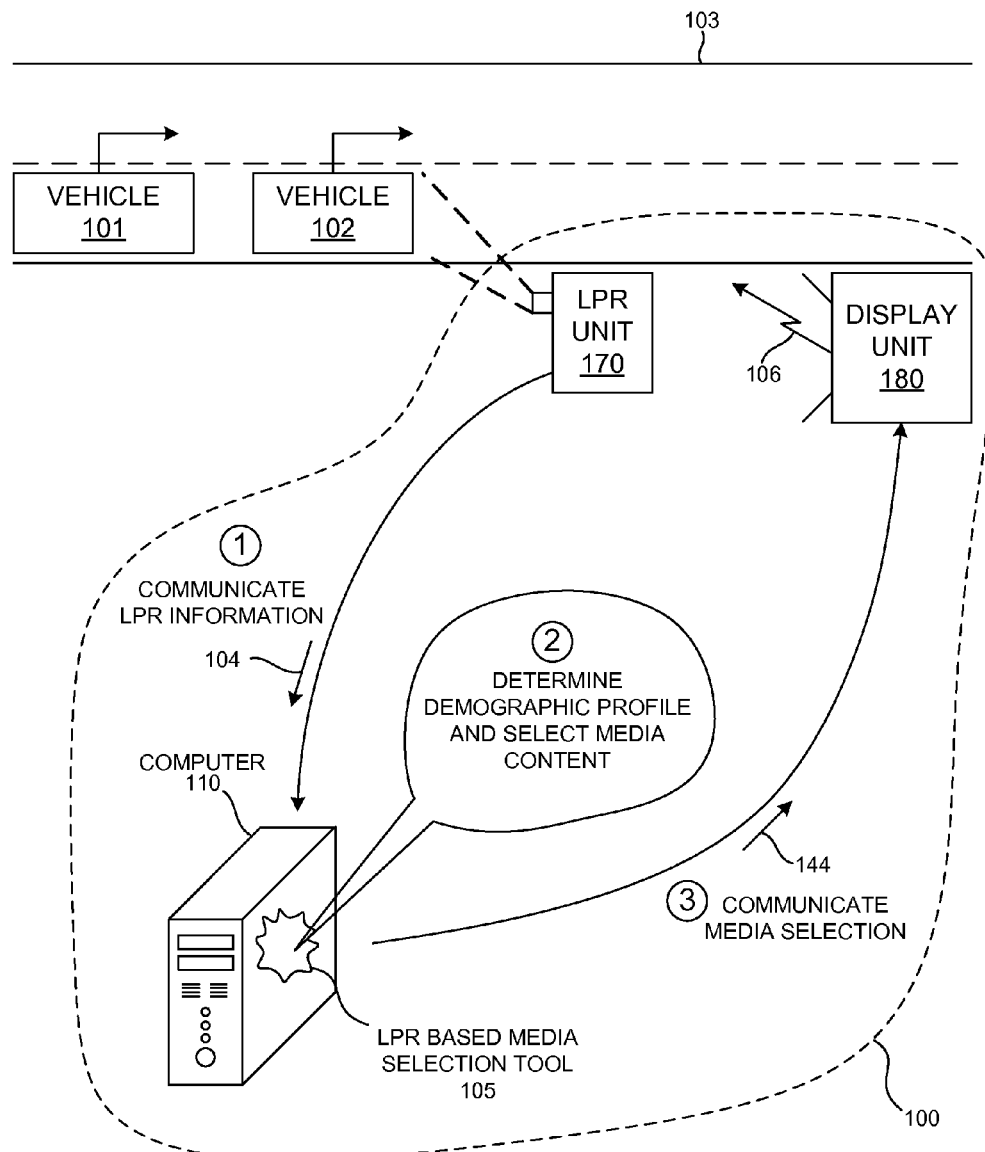
FIG. 1 is a diagram illustrative of an embodiment of LPR based media presentation system 100 in one exemplary operational scenario.

FIG. 1 is a diagram illustrative of an embodiment of LPR based media presentation system 100 in one exemplary operational scenario. LPR based media selection system 100 includes a LPR unit 170, a general purpose computer 110 operable to implement LPR based media selection tool 105, and display unit 180. LPR unit 170 and display unit 180 are communicatively coupled to general purpose computer 110. For example, LPR unit 170 and display unit 180 may be communicatively coupled to computer 110 by a wired or wireless communication link. In some embodiments, computer 110 may be collocated with any of LPR unit 170 and display unit 180. In some other embodiments, computer 110 may be distally located from any of LPR unit 170 and display unit 180. For example, in some embodiments, computer 110 may be a server located at a remote facility and computer 110 may be communicatively linked to one or more distally located LPR units and display units 180 by a wired or wireless communication link.

In the embodiment illustrated in FIG. 1, LPR unit 170 and display unit 180 of LPR based media presentation system 100 are placed alongside a roadway 103. Passing traffic includes vehicles 101 and 102. LPR based media presentation system 100 captures LPR information 104 associated with vehicles 101 and 102 as they pass LPR unit 170, determines demographic attributes associated with likely occupants of vehicles 101 and 102 based on the LPR information 104, generates content display instructions 144 based on the demographic attributes, and presents the selected media content 106 to vehicles 101 and 102 as they pass display unit 180. In the illustrated embodiment LPR unit 170 and display unit 180 are in different locations. However, in other embodiments, they may be collocated. In some other embodiments, LPR information may be captured at roadway 103 by LPR unit 170, but the selected media content may be presented elsewhere. For example, LPR information may be captured at many locations leading to a public or private venue (e.g., shopping mall, sporting complex, tourist sites, government or corporate complex) and the selected media content may be displayed within the public venue (e.g., inside the mall, etc.).

LPR unit 170 is placed in a fixed location in view of passing vehicles (e.g., alongside a roadway, over a roadway, embedded in the surface of a roadway, etc.). LPR unit 170 includes a camera module (not shown) that captures at least one image of a passing vehicle (e.g., vehicles 101 and 102). In some embodiments, LPR unit 170 includes image sensors with the ability to capture a set of at least two images for each passing vehicle. One image may be an infrared image useful to identify the license plate number. A second image may be an overview image of a larger area of the vehicle useful to identify vehicle characteristics. In addition, LPR unit 170 includes a timing module (not shown) that determines the time of image capture. Each captured image and its associated time of capture are included in LPR information 104 associated with a distinct LPR instance. In some embodiments, LPR unit 170 performs image analysis on each captured image to identify the license plate number associated with the passing vehicle. In the depicted embodiment, LPR unit 170 communicates LPR information 104 associated with each LPR instance to computer 110.

In some embodiments a number of LPR units 170 may be located at a particular location about roadway 103, each configured to capture images of passing vehicles from different perspectives. For example an LPR unit may be positioned to face traffic and capture an image of oncoming vehicles. Another LPR unit may be positioned facing the back of passing vehicles and capture an image of passing vehicles from behind. Another LPR unit may be positioned above roadway 103 and capture an image of the passing vehicles from an elevated perspective view. Another LPR unit may be embedded in the surface of roadway 103 and capture an image of the passing vehicles from ground level perspective view. In some embodiments, LPR units may be configured to capture images of passing vehicles in both directions of roadway 103.

In some embodiments, a location code is associated with each LPR unit in a fixed location. The location code may be a predetermined code that indicates the location of LPR unit 170. In some embodiments, LPR unit 170 includes a location code with LPR information 104 communicated to computer 110.

LPR information 104 received by computer 110 is stored in memory 150. FIG. 2 is illustrative of a plurality of LPR instances (151-157) stored in memory 150. Each LPR instance includes LPR information 104 received from LPR unit 170. In addition, each LPR instance includes vehicle information 148 and demographic information 149 derived from LPR information 104. In the illustrated example, LPR information 104 includes a location code, image information (e.g., image of license plate, perspective view of vehicle, etc.), a license plate number, and the time of image capture associated with each LPR instance.

In one example, LPR information 104 communicated from LPR unit 170 to computer 110 includes captured image data and the time of capture associated with each LPR instance and additional image processing tasks are performed by computer 110. In this manner, computer 110 determines the license plate number, vehicle information 148 and demographic information 149 illustrated in FIG. 2. However, in some other examples, LPR unit 170 may perform any number of the additional image processing tasks and communicate the results to computer 110. In this manner, LPR 170 determines any of the license plate number, vehicle information 148, and demographic information 149 illustrated in FIG. 2.

Vehicle information (e.g., vehicle information 148) includes characteristics of a vehicle derived from the captured image information. For example, vehicle information may include the Vehicle Identification Number (VIN), the vehicle classification (e.g., compact automobile, mid-size automobile, heavy truck, medium truck, motorcycle, etc.), the vehicle make and model, vehicle color, the state associated with the license plate, and estimated vehicle value. In some examples, elements of vehicle information are determined from publically available vehicle registration records associated with the license plate number determined by LPR unit 170. For example, the VIN, the vehicle classification, the vehicle make and model, the vehicle color, and estimated vehicle value may be determined by computer 110 from publically available records. In some other examples, elements of vehicle information are determined from captured image information associated with each LPR instance. For example, computer 110 may identify any of the make and model of the vehicle, the vehicle classification, and a color of the passing vehicle from overview image data. In another example, the state (e.g., Nevada, Massachusetts, etc.) associated with a particular license plate may be determined from an image recognition algorithm performed on an image of the license plate.

Demographic information (e.g., demographic information 149) includes demographic attributes of likely occupants of vehicles associated with each LPR instance. For example, demographic information may include a zip code associated with the vehicle registration, the gender of the vehicle occupant, the age of the vehicle occupant, etc.

In some examples, elements of demographic information 149 are determined from publically available vehicle registration records associated with the license plate number determined by LPR unit 170. For example, the zip code plus four digit code of the registered owner of the vehicle may be determined from publically available vehicle registration records.

In some other examples, elements of demographic information are determined from captured image information associated with each LPR instance. For example, computer 110 may identify any of the number of occupants of the vehicle, whether any of the occupants are children, the age, gender, or race of any of the occupants of the vehicle based on image analysis of the captured image information associated with each LPR instance.

In some other examples, elements of demographic information are derived from vehicle information derived from the license plate number identified for each LPR instance. For example, any of the duration of residence at the current address, marital status, family size, number of vehicles owned, and estimated income of registered owners may be determined from publically accessible information sources (e.g., LexisNexis®, accessible at www.lexisnexis.com, TLO®, accessible at www.tlo.com, etc.) based on information gleaned from publically available vehicle registration records. In another example, a number of vehicle characteristics may be collected from publically available records (e.g., vehicle registration records). Based on these vehicle characteristics, demographic attributes associated with likely occupant of the vehicle may be determined from publically accessible information sources (e.g., LexisNexis®, accessible at www.lexisnexis.com, TLO®, accessible at www.tlo.com, etc.). For example, if the car is determined to be a model E350 manufactured by Mercedes-Benz®, it may be determined based on publically accessible demographic studies that 60% of the owners of this car are female, working professionals between the ages of 35 and 50 years old, 25% are male, working professionals between the ages of 35 and 50 years old, 10% are retired females between the ages of 55 and 70 years old, and the rest belong in other categories. As illustrated in FIG. 2, the demographic attributes associated with each LPR instance are stored in memory 150 as demographic information 149.

In one aspect, a demographic attribute associated with a likely occupant of a passing vehicle is determined based on a license plate number identified with the vehicle. In response, media content targeted to the likely occupant of the passing vehicle is selected based on the demographic attribute. The selected media content is then presented within view of the occupant of the passing vehicle.

Figure 4:
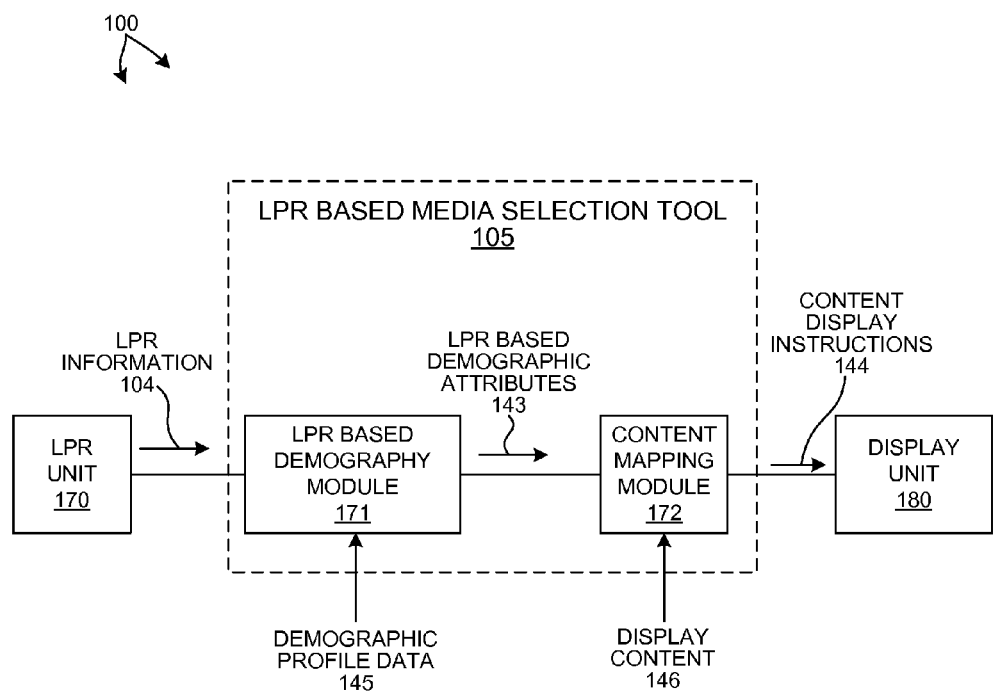
FIG. 4 is illustrative of a LPR based media selection tool 105 operable in accordance with the method of LPR based media selection 300 illustrated in FIG. 5.
Figure 5:
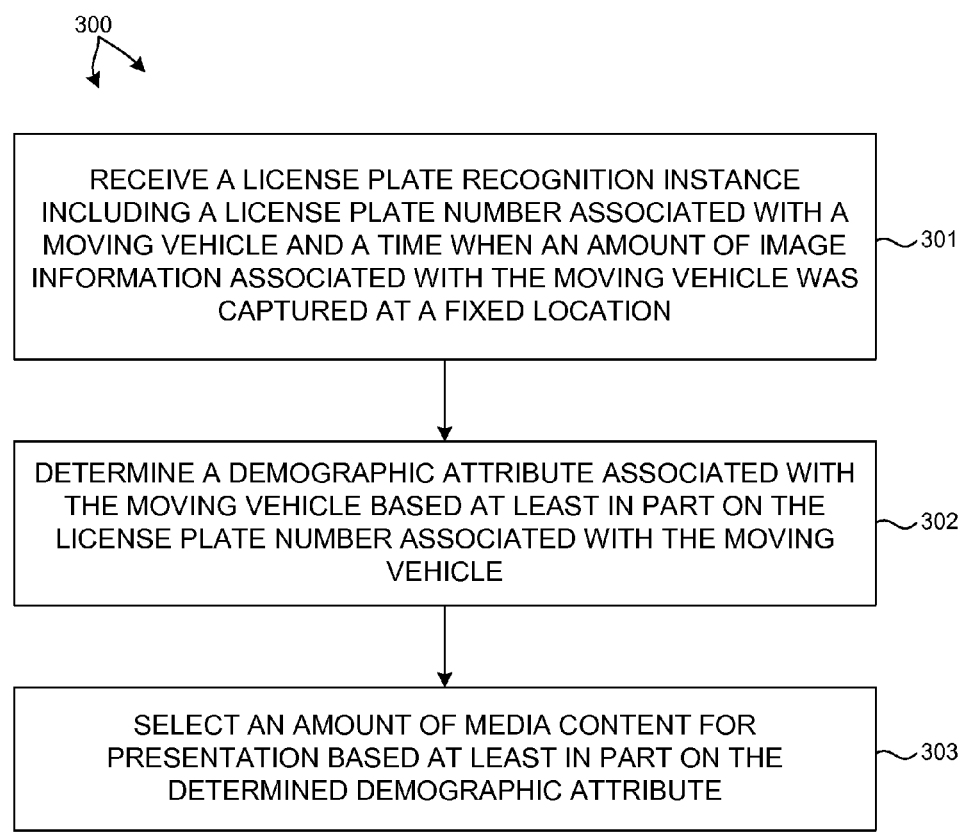
FIG. 5 is a flowchart illustrative of one exemplary method 300 of LPR based media selection.

FIG. 4 is illustrative of a LPR based media selection tool 105 operable in accordance with the method of LPR based media selection 300 illustrated in FIG. 5. This illustration and corresponding explanation are provided by way of example as many other embodiments and operational examples may be contemplated. In the depicted embodiment, LPR based media selection tool 105 includes an LPR based demography module 171 and a media content mapping module 172. In the depicted embodiment, LPR based media selection tool 105 receives LPR information 104 from LPR unit 170 and communicates content display instructions 144 to display 180.

In one example of block 301 of method 300, LPR based demography module 171 receives LPR information for a particular LPR instance. The LPR information includes a license plate number associated with a vehicle passing by LPR unit 170 and the time of image capture.

In one example of block 302, LPR based demography module 171 determines a demographic attribute associated with occupants of the moving vehicle based at least in part on the license plate number associated with the passing vehicle. For example, LPR based demography module 171 may access publically available demographic profile data 145 (e.g., vehicle registration records) that indicates that the vehicle with the identified license plate number is a model E350 manufactured by Mercedes-Benz®. In addition, LPR based demography module 171 may access additional publically accessible demographic profile data 145 (e.g., third party market research) that indicates that drivers of a model E350 manufactured by Mercedes-Benz are 60% female, working professionals between the ages of 35 and 50 year old, 25% male, working professionals between the ages of 35 and 50 years old, and 10% retired females between the ages of 55 and 70 years old. These LPR based demographic attributes 143 are communicated to media content mapping module 172.

In some examples, demographic profile data 145 is stored in a database stored in memory 130 of computer 110, or on a server accessible to computer 110. In this manner, the demographic profile data associated with the vehicle license plate is quickly accessible.

In one example of block 303, media content mapping module 173 selects an amount of media content for presentation based at least in part on the determined demographic attribute associated with a likely occupant of the vehicle. Media content mapping module 173 accesses display content 146 including a number of different advertisements each targeted differing demographic groups. Media content mapping module 173 maps the LPR based demographic attributes of the passing car with advertisements that target those demographic attributes. For example, an advertisement for luxury wristwatches is targeted to male and female working professionals between ages 35 and 50 years old. In one example, media content mapping module 173 assigns a high score to the match between the advertisement for luxury wristwatches with the demographic attributes of the likely occupants of the passing car (e.g., 85% match). In contrast, an advertisement for low-priced alcoholic beverages does not target male and female working professionals between ages 35 and 50 years old, nor retired females between ages 55 and 70 years old. As a result, media content mapping module 173 assigns a low score (e.g. 10%) to the match between the advertisement for low-priced alcoholic beverages and the likely occupants of the passing car. Based on the assigned scores, content mapping module 172 selects media content 106 for presentation to the occupants of the passing car. Content mapping module 172 generates content display instructions 144 that cause display unit 180 to present the selected media content 106. For example, content mapping module generates content display instructions 144 that cause display unit 180 to display the two highest ranked advertisements in rank order for five seconds each.

In some examples, display content 146 is stored in a database stored in memory 130 of computer 110, or on a server accessible to computer 110. In this manner, the display content is quickly accessible. Moreover, in some examples, the demographic score of each advertisement for each different demographic group is pre-computed and stored. In this manner, the mapping of an LPR based demographic attribute with advertisements that target those demographic attributes is quickly realized. In one example, content mapping module 172 receives an LPR based demographic attribute associated with a likely occupant of a passing vehicle. Content mapping module 172 then queries the database of display content for advertisements with a demographic score associated with that demographic attribute. In response, content mapping module 172 receives an indication of the score of each advertisement associated with that demographic attribute. Content mapping module 172 then ranks the advertisements based on their score and selects the advertisements for presentation (e.g., the highest scoring advertisements). In another example, content mapping module 172 may query the database of display content for advertisements with a demographic score above a predetermined threshold that are associated with that demographic attribute. In this manner, the number of advertisements returned to content mapping module 172 is reduced.

In another aspect, a LPR based media presentation system 100 identifies a demographic profile of likely vehicle occupants passing a particular location based on LPR information gathered at that location over a period of time or a predetermined number of different license plate recognition instances. The LPR based media presentation system selects media content for presentation based on the identified demographic profile. In this manner, media content is presented to viewers that is targeted to reach segments of the identified demographic profile and is able to evolve with changes in the demographic profile.

A demographic profile associated with a group of vehicles passing a location within a particular time frame may be identified based on license plate numbers identified from LPR instances associated with passing vehicles. In response, media content targeted to the likely occupants of the passing vehicles is selected based on the demographic profile. A demographic profile of a group of passing vehicles may be determined based on identifying common demographic characteristics associated with sub-groups of passing vehicles. For example a demographic profile may be generated based on the observation that 60% of the passing vehicles identified in the time frame are luxury makes and models, 20% are medium and heavy duty trucks, and 20% are minivans. These sub-groups may be determined by LPR based demography module 171 by grouping LPR instances associated with the particular time frame that share common vehicle information 148. The demographic profile of the likely occupants of each sub-group of passing vehicles is mapped to advertising content by content mapping module 172 based on the identified sub-groups. For example, if 60% of the passing vehicles are luxury makes and models, advertising targeting likely drivers of these vehicles is mapped with the highest priority. Advertising targeting likely drivers of medium and heavy duty trucks and minivans are assigned a lower priority.

In another aspect, a demographic profile associated with vehicles passing a location may be identified based on repeated LPR instances associated with the same vehicle. For example, if one or more vehicles repeatedly pass a particular location at a similar time of day on the same days of the week (e.g., every Monday through Friday), a demographic profile of the traffic flow at that location for a particular time period may be determined by LPR based demography module 171 based on repeated LPR instances of the same vehicles. The demographic profile of the likely occupants of the passing vehicles is mapped to advertising content by content mapping module 172.

As illustrated in FIG. 2, LPR instance 151 indicates that a license plate number "XYZ123" was recognized by LPR unit 170 at 06:14:26am on Sep. 12, 2011. LPR instance 155 indicates that the same license plate number was recognized by LPR unit 170 at the same location at 06:09:48am on Sep. 13, 2011. Similarly, repeated LPR instances 153 and 157 associated with license plate number "RUX155" and LPR instances 154 and 156 associated with license plate number "RFT597" are stored in memory 150.

In one example, LPR based demography module 171 selects LPR instances of the same license plate number. Based on these repeated LPR instances of the same vehicles, LPR based demography module 171 identifies a demographic profile associated with likely occupants of these vehicles. For example, if the same license plate number is repeatedly recognized by LPR unit 170 each weekday at a similar time, it can be inferred that the likely occupant of the vehicle is employed. In addition, based on the location of the LPR unit 170 and publically available information about surrounding businesses, the type of employment may be inferred. The demographic profile of the likely occupants of the passing vehicles is mapped to advertising content by content mapping module 172.

In another example, repeated LPR instances are identified as "local," whereas singular LPR instances are identified as "transitory." The demographic profile of the likely occupants of "local" vehicles is identified with that of the local community. The resulting profile is mapped to advertising content by content mapping module 172.

In a further aspect, media content is sequentially selected based on a periodically repeating demographic profile. For example, the demographic profile of likely occupants of vehicles passing a particular location during commute hours on a busy metropolitan freeway repeats each workday. Moreover, many of the same occupants of the passing vehicles pass the same location each workday. In response to this demographic profile, media content mapping module 172 sequentially selects media content that follows a storyline. In this manner, vehicle occupants are drawn to the advertisement each day to see the next installment of the story.

In addition to demographic data, general traffic statistics can be accumulated by LPR based media presentation system 100. For example, a cumulative count of passing vehicles can be generated. In another example, a cumulative count of each identified vehicle classification can be generated. For example, the number of passing heavy trucks, medium trucks, cars, and motorcycles may be tracked over time. This information may be useful for road maintenance planning purposes. In another example, a cumulative count of the number of vehicles manufactured by a particular maker (e.g., Mercedes-Benz®) is generated by LPR based demography module 171.

In addition, the speed of passing vehicles may be estimated by LPR based media presentation system 100. This information may be useful for road capacity planning and projections. For example, commute patterns may be studied based on the average speed of passing vehicles. The speed of vehicles passing a location at a particular time may be identified based on the time between successive LPR instances. In one example, LPR based demography module 171 determines an average time between successive LPR instances at a particular location. For example, a small average time between successive LPR instances would indicate high traffic density moving at normal speed. A large average time between successive LPR instances would indicate either sparse traffic flow at normal speed or a traffic jam (e.g., very high traffic density, but low speed). To differentiate between these two possible scenarios, LPR based demography module 171 determines a measure of variance (e.g., standard deviation) of the time between successive LPR instances. A high variance would indicate a sparse traffic flow moving at normal speeds because the time between each passing vehicle is inconsistent for sparse traffic. In contrast, a low variance would indicate a high density traffic flow because the time between successive LPR instances is very consistent (i.e., low variance).

In yet another aspect, a demographic profile associated with vehicles passing a location at a particular time may be identified based on the time between successive LPR instances. In one example, LPR based demography module 171 determines that a high density traffic flow exists at a particular location based on the time between successive LPR instances as discussed hereinbefore. The likely occupants of passing vehicles in the high density traffic flow are likely to be apprehensive and irritated. Based on this demographic attribute, content mapping module 172 selects advertising content targeted to apprehensive and irritated people (e.g., advertisements for resort vacations).

In yet another aspect, media content is selected based on a response to an offer to present particular media content that matches a demographic profile of likely occupants of passing vehicles that is currently trending. For example, LPR based demography module 171 may determine that a demographic profile has developed and will likely persist for a period of time. For example, based on a current demographic profile that matches the demographic profile at this location every Monday through Friday at this time, LPR based demography module 171 determines that the current demographic profile will persist (e.g., 60% males, hourly employed will be passing for the next hour). In response to this demographic prediction, media content mapping module 172 communicates an offer to an advertising entity to display particular advertising content targeting this demographic for the next hour. In response to receiving an affirmative response to the offer, content mapping module 172 generates content display instructions 144 that cause display unit 180 to display the advertising content.

In another aspect, different locations are ranked based on the demographic profile determined from LPR information captured from traffic flows past each location. In one example, LPR units are located in different places (e.g., different roadways, next to different billboards, etc.). LPR information is captured from traffic flows past each location. A demographic profile of the traffic flow past each location is determined based on LPR information as discussed hereinbefore. For example a demographic profile of a traffic flow at a first location may be generated based on the observation that 60% of the passing vehicles identified in the time frame are luxury makes and models, 20% are medium and heavy duty trucks, and 20% are minivans. A demographic profile of a traffic flow at a second location may be generated based on the observation that 10% of the passing vehicles identified in the time frame are luxury makes and models, 40% are medium and heavy duty trucks, and 50% are passenger vehicles. In some examples, the relative value of each different location with respect to particular advertising content is determined based on the demographic profile. For example, the demographic profile of the first location includes a relatively high percentage of luxury vehicles. Hence the first location is ranked higher than the second location for advertisements of luxury products. In this manner, the relative value of different advertising locations is assessed based on the demographic profile of traffic flows past each location determined based on LPR information. In a further example, media content targeted to the likely occupants of the passing vehicles is selected based on the demographic ranking. For example, content mapping module 172 determines that an advertisement for a luxury product should be presented at the first location, rather than the second location based on the identified demographic ranking.

It should be recognized that the various steps described throughout the present disclosure may be carried out by a single computer system 110 or, alternatively, a multiple computer system 110. Moreover, different subsystems of a LPR based media presentation system 100 may include a computer system suitable for carrying out at least a portion of the steps described herein. Therefore, the description presented herein should not be interpreted as a limitation on the present invention but merely an illustration. Further, the one or more computer systems 110 may be configured to perform any other step(s) of any of the method examples described herein.

Figure 3:
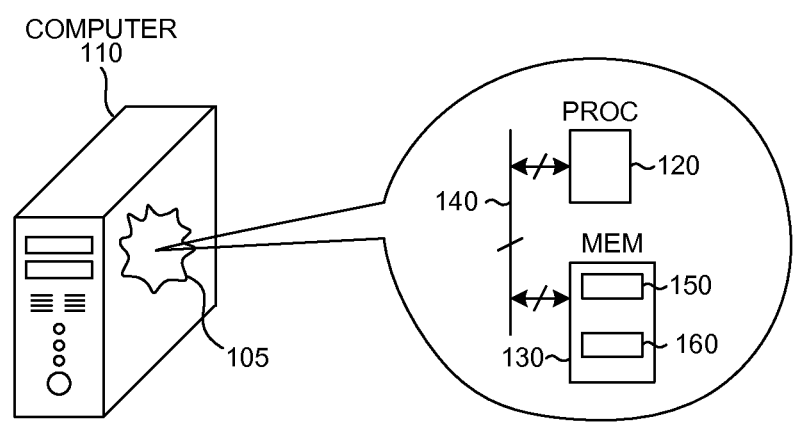
FIG. 3 is a diagram illustrative of a computer 110 including a processor 120 and a memory 130 that stores program instructions that, when executed by processor 120, causes processor 120 to implement LPR based media selection functionality.

The computer system 110 may be configured to receive and/or acquire data or information from the subsystems of the LPR based media presentation system 100 (e.g., LPR unit 170, publically available information databases, media content databases, LPR databases, etc.) by a transmission medium that may include wireline and/or wireless portions. In this manner, the transmission medium may serve as a data link between the computer system 110 and other subsystems. Further, the computing system 110 may be configured to receive parameters or instructions via a storage medium (i.e., memory). For example, as illustrated in FIG. 3, computer 110 includes a processor 120 and a memory 130. Processor 120 and memory 130 may communicate over bus 140. Memory 130 includes an amount of memory 160 that stores program instructions that, when executed by processor 120, causes processor 120 to implement LPR based media selection functionality by operation of LPR based media selection tool 105. In addition, memory 130 includes an amount of memory 150 that stores a number of LPR instances. In another example, LPR instances are stored in a database on an external server. In this regard, signals indicative of the LPR instances may be imported from an external system.

Moreover, the computer system 110 may send data to external systems via a transmission medium. The transmission medium may include wireline and/or wireless portions. In this manner, the transmission medium may serve as a data link between the computer system 110 and other subsystems or external systems. For example, computer system 110 may send results generated by computer system 210 to external systems or to other subsystems of via a transmission medium.

The computing system 110 may include, but is not limited to, a personal computer system, mainframe computer system, workstation, image computer, parallel processor, or any other device known in the art. In general, the term "computer system" may be broadly defined to encompass any device having one or more processors, which execute instructions from a memory medium.

Program instructions implementing methods such as those described herein may be transmitted over or stored on a carrier medium (e.g., memory 160). The carrier medium may be a transmission medium such as a wire, cable, or wireless transmission link. The carrier medium may also include a computer-readable medium such as a read-only memory, a random access memory, a magnetic or optical disk, or a magnetic tape.

As discussed above, method 300 may be executed by LPR based media selection tool 105 running within computer 110. An operator may interact with LPR based media selection tool 105 via a locally delivered user interface (e.g., GUI displayed by terminal equipment directly connected to computer 110). In other embodiments, an operator may interact with LPR based media selection tool 105 via a web interface communicated over the internet.

Figure 6:
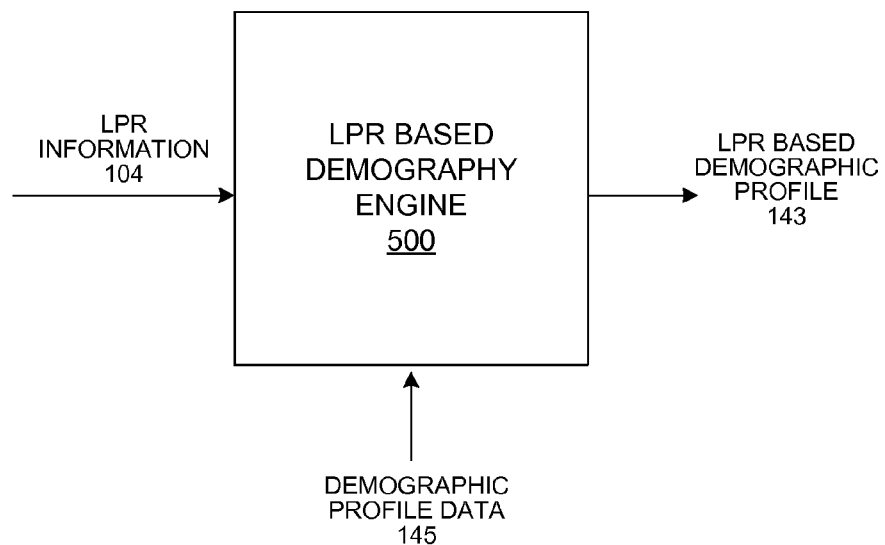
FIG. 6 illustrates a LPR based demography engine 500 configured to implement LPR based media selection functionality.

Although, method 300 may be executed by LPR based media selection tool 105 running within computer 110, it may also be executed in part by dedicated hardware. FIG. 6 illustrates a LPR based demography engine 500 configured to implement LPR based media selection functionality as discussed herein. In one example, LPR based demography engine 500 receives LPR information 104 and demographic profile data 145 as input. LPR based demography engine 500 implements LPR based media selection functionality as discussed herein and generates an LPR based demographic profile 143.

Figure 7:
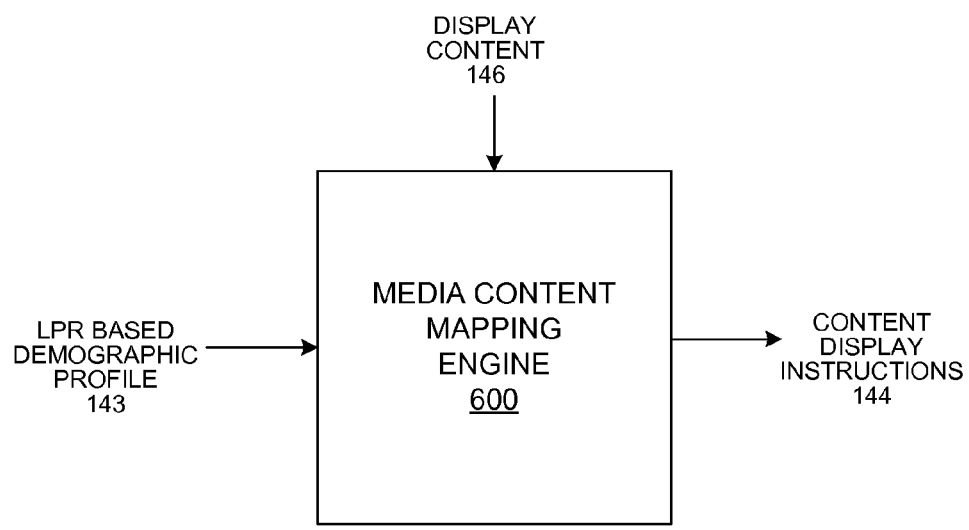
FIG. 7 illustrates a media content mapping engine 600 configured to implement LPR based media selection functionality.

Although, method 300 may be executed by LPR based media selection tool 105 running within computer 110, it may also be executed in part by dedicated hardware. FIG. 7 illustrates a media content mapping engine 600 configured to implement LPR based media selection functionality as discussed herein. In one example, media content mapping engine 600 receives a LPR based demographic profile 143 and display content 146 as input. Media content mapping engine 600 implements LPR based media selection functionality as discussed herein and generates content display instructions 144 useable to command a display unit 180 to display particular media content.

In one or more exemplary embodiment, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. For example, selected media may be presented by a display unit 180, however, in other examples, selected media may be presented by targeted e-mails or conventional mailings based on the identified demographic profile. Accordingly, various modifications, adaptations, and combinations of various features of the described embodiments can be practiced without departing from the scope of the invention as set forth in the claims.

What is claimed is:

1. A method comprising:
receiving a first plurality of license plate recognition instances including a license plate number associated with each of a first plurality of moving vehicles passing a first fixed location and a time when an amount of image information associated with each of the first plurality of moving vehicles was captured from the first fixed location;
determining a demographic attribute associated with a likely occupant of each of the first plurality of moving vehicles based at least in part on the license plate number associated with each of the first plurality of moving vehicles; and
determining a first demographic profile of the first plurality of moving vehicles passing the first fixed location based on the demographic attributes associated with each of the first plurality of moving vehicles.

2. The method of claim 1, further comprising:
selecting an amount of media content for presentation based at least in part on the determined demographic profile.

3. The method of claim 2, wherein the selecting of the amount of media content for presentation is based at least in part on the first determined demographic profile, and wherein the selecting of the amount of media content for presentation is based at least in part on an amount of media content previously selected.

4. The method of claim 1, further comprising:
capturing the amount of image information associated with each of the first plurality of moving vehicles from the first fixed location and the time of capture of the amount of image information; and
determining the license plate number associated with each of the first plurality of moving vehicles based on the amount of image information.

5. The method of claim 4, wherein the determining of the demographic attribute associated with the likely occupant of each of the first plurality of moving vehicles involves publically available demographic information identified with the determined characteristic of each of the first plurality of moving vehicles.

6. The method of claim 1, further comprising:
determining a characteristic of each of the first plurality of moving vehicles based on the amount of image information.

7. The method of claim 6, wherein the characteristic of each of the first plurality of moving vehicles is any of a make and model of the moving vehicle, a classification of the moving vehicle, and a color of the moving vehicle.

8. The method of claim 1, further comprising:
presenting the amount of selected media content on a display system.

9. The method of claim 1, wherein the determining of the demographic attribute associated with the likely occupant of each of the first plurality of moving vehicles involves publically available demographic information identified with the license plate number associated with each of the first plurality of moving vehicles.

10. The method of claim 9, wherein the determining of the first demographic profile involves a predetermined number of different license plate recognition instances.

11. The method of claim 9, wherein the determining of the first demographic profile involves a plurality of different license plate recognition instances within a predetermined period of time.

12. The method of claim 1, further comprising:
receiving a second plurality of license plate recognition instances including a license plate number associated with each of a second plurality of moving vehicles passing a second fixed location and a time when an amount of image information associated with each of the second plurality of moving vehicles was captured from the second fixed location;
determining a demographic attribute associated with a likely occupant of each of the second plurality of moving vehicles based at least in part on the license plate number associated with each of the second plurality of moving vehicles;
determining a second demographic profile of the second plurality of moving vehicles passing the second fixed location based on the demographic attributes associated with each of the second plurality of moving vehicles; and
determining a relative value of each of the first and second fixed locations with respect to particular advertising content based on the first and second demographic profiles.

13. A non-transitory, computer-readable medium, comprising:
code for causing a computer to receive a plurality of license plate recognition instances including a license plate number associated with each of a plurality of moving vehicles passing a fixed location and a time when an amount of image information associated with each of the plurality of moving vehicles was captured from the fixed location;
code for causing the computer to determine a demographic attribute associated with a likely occupant of each of the plurality of moving vehicles based at least in part on the license plate number associated with each of the plurality of moving vehicles;
code for causing the computer to determine a demographic profile of the plurality of moving vehicles passing the fixed location based on the demographic attributes associated with each of the plurality of moving vehicles; and
code for causing the computer to select an amount of media content for presentation based at least in part on the determined demographic profile.

14. The non-transitory, computer-readable medium of claim 13, further comprising:
code for causing the computer to communicate content display instructions to a display system, wherein the content display instructions cause the display system to present the amount of selected media content on the display system.

15. The non-transitory, computer-readable medium of claim 13, wherein the determining of the demographic attribute associated with each of the plurality of moving vehicles is based on publically available demographic information identified with the license plate number of each of the plurality of moving vehicles.

16. The non-transitory, computer-readable medium of claim 13, wherein the selecting the amount of media content for presentation involves a score indicative of a match between the media content and the determined demographic profile.

17. A License Plate Recognition (LPR) based media presentation system comprising:
a License Plate Recognition (LPR) module operable to determine a license plate number associated with each of a plurality of moving vehicles passing a fixed location;
a LPR based demography module operable to determine a demographic attribute associated with a likely occupant of each of the plurality of moving vehicles based at least in part on the license plate number associated with each of the plurality of moving vehicles and determining a demographic profile of the plurality of moving vehicles passing the fixed location based on the demographic attributes associated with each of the plurality of moving vehicles; and
a content mapping module operable to determine an amount of media content for presentation based at least in part on the determined demographic profile.

18. The LPR based media presentation system of claim 17, further comprising:
a display module that presents the amount of media content determined by the content mapping module.

19. The LPR based media presentation system of claim 17, wherein the LPR based demography module determines the demographic attribute associated with the likely occupant of each of the plurality of moving vehicles based on publically available demographic information identified with the license plate number.

* * * * *